Patented Oct. 23, 1934

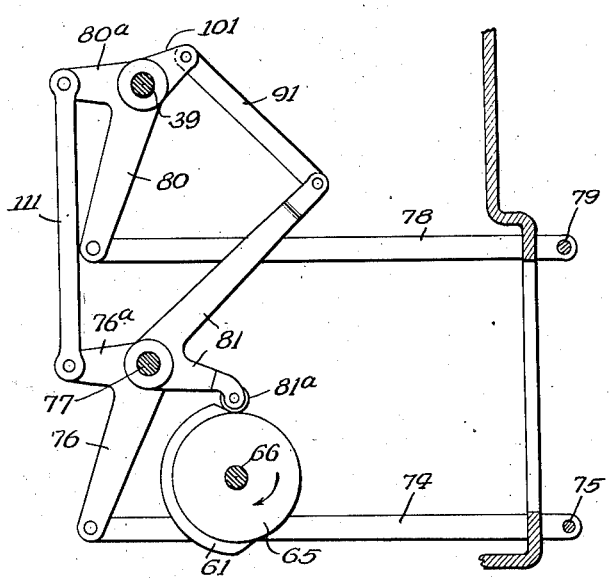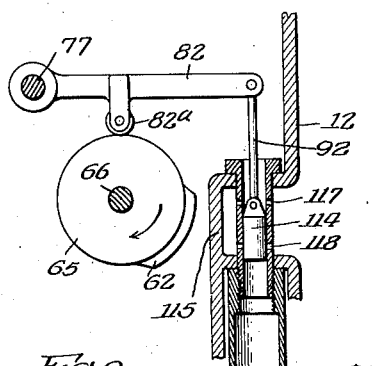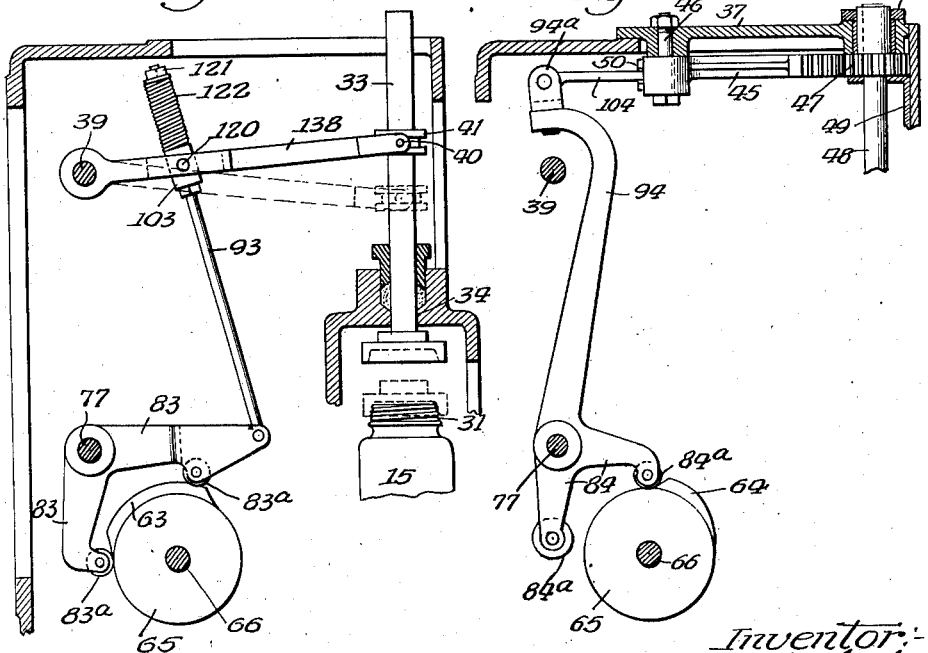

1,978,095

UNITED STATES PATENT OFFICE 1,978,095

BOTTLE CAPPING MACHINE

August C. Spahn, Evansville, Ind., assignor to Bernardin Bottle Cap Co., Evansville, Ind., a corporation of Indiana Application March 31, 1931, Serial No. 526,668

24 Claims. (Cl. 226—82)

The invention relates generally to bottle capping machines and more particularly to an improved machine operable automatically to cap bottles in a vacuum.

The general object of the invention is to provide a new and improved capping machine embodying a vacuum chamber together with means for positioning bottles having caps loosely placed thereon in said chamber, and means automatically operable after a bottle has been so positioned in said chamber to close and vacuumize the chamber and to apply the cap tightly to the bottle.

Another object is to provide such a machine embodying means for feeding bottles, having screw caps placed loosely thereon, to a reciprocatory support positioned adjacent the vacuum chamber and adapted to be moved into the chamber, means for moving the support into and out of said chamber, and means operable automatically to vacuumize the chamber and to screw the cap on tightly while the support is in the chamber.

A more specific object is to provide such a machine embodying a casing forming a vacuum chamber and having an inlet opening, a reciprocatory means movable into and out of said opening adapted to support a bottle to be capped, and arranged in one position to close the opening in the casing, means extending into the casing and carrying a cap-applying member, and means for moving said cap-applying member into engagement with a cap placed loosely on a bottle on said support and for rotating said cap-applying member when in such position to apply the cap tightly to the bottle.

Other objects will become apparent from the following detailed description taken in connection with the accompanying drawings, in which:

Fig. 6 is a fragmentary view of the cam and connections for the reciprocating support.

Fig. 7 is a similar view of the cam and connections for the vacuum control valve.

Fig. 8 is a similar view of the cam and connections for the vertical movement of the cap-applying member.

Fig. 9 is a similar view of the cam and connections for rotating the cap-applying member.

Figure 1:
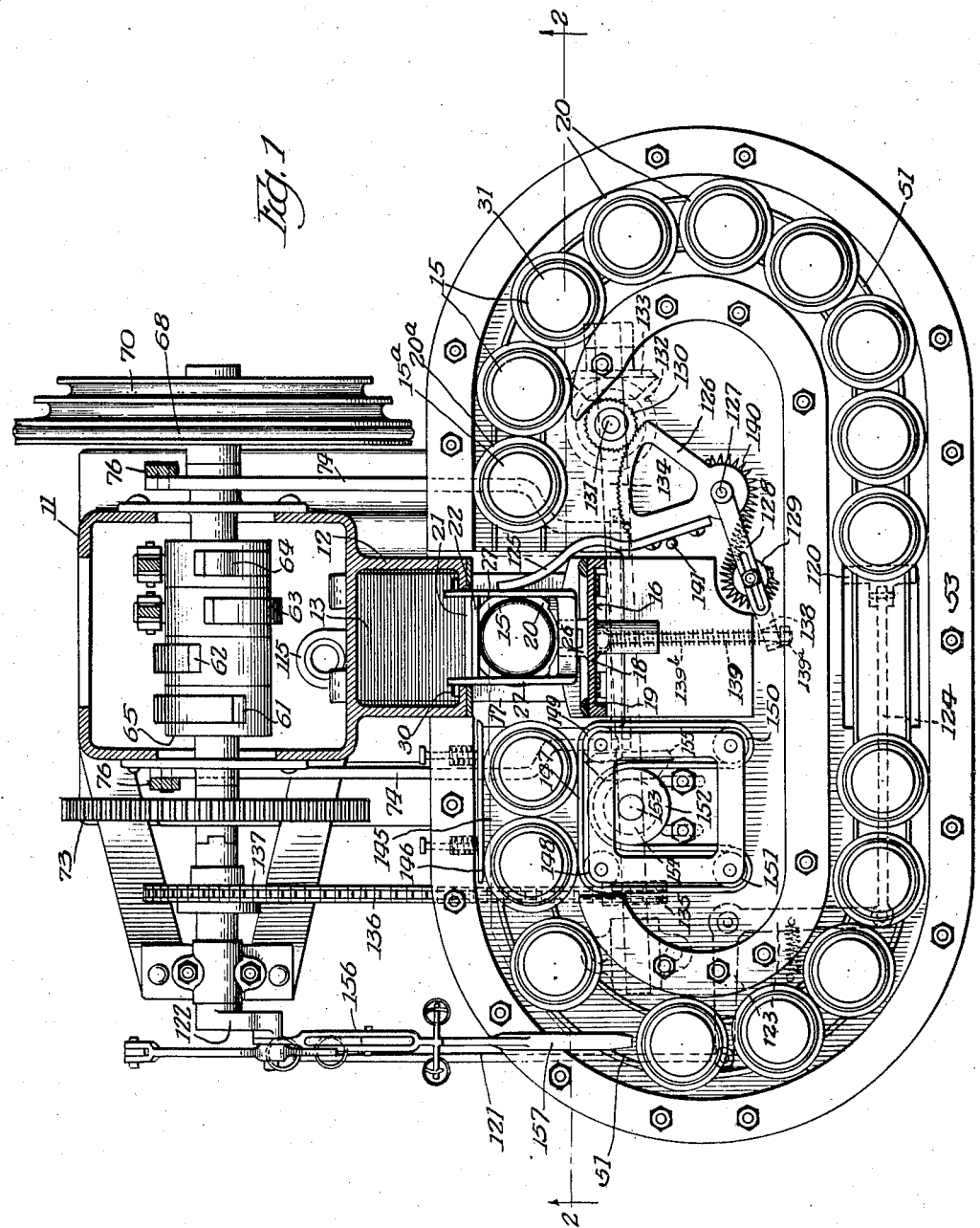
Fig. 1 is a plan view of a preferred form of the invention, partly in section along the line 1—1 of Fig. 2.

While I have shown in the drawings and will herein describe in detail the preferred embodiment of my invention, it is to be understood that I do not thereby intend to limit the invention to the specific form disclosed, but aim to cover all modifications and alternative constructions falling within the spirit and scope of the invention as expressed in the appended claims.

Figure 3:
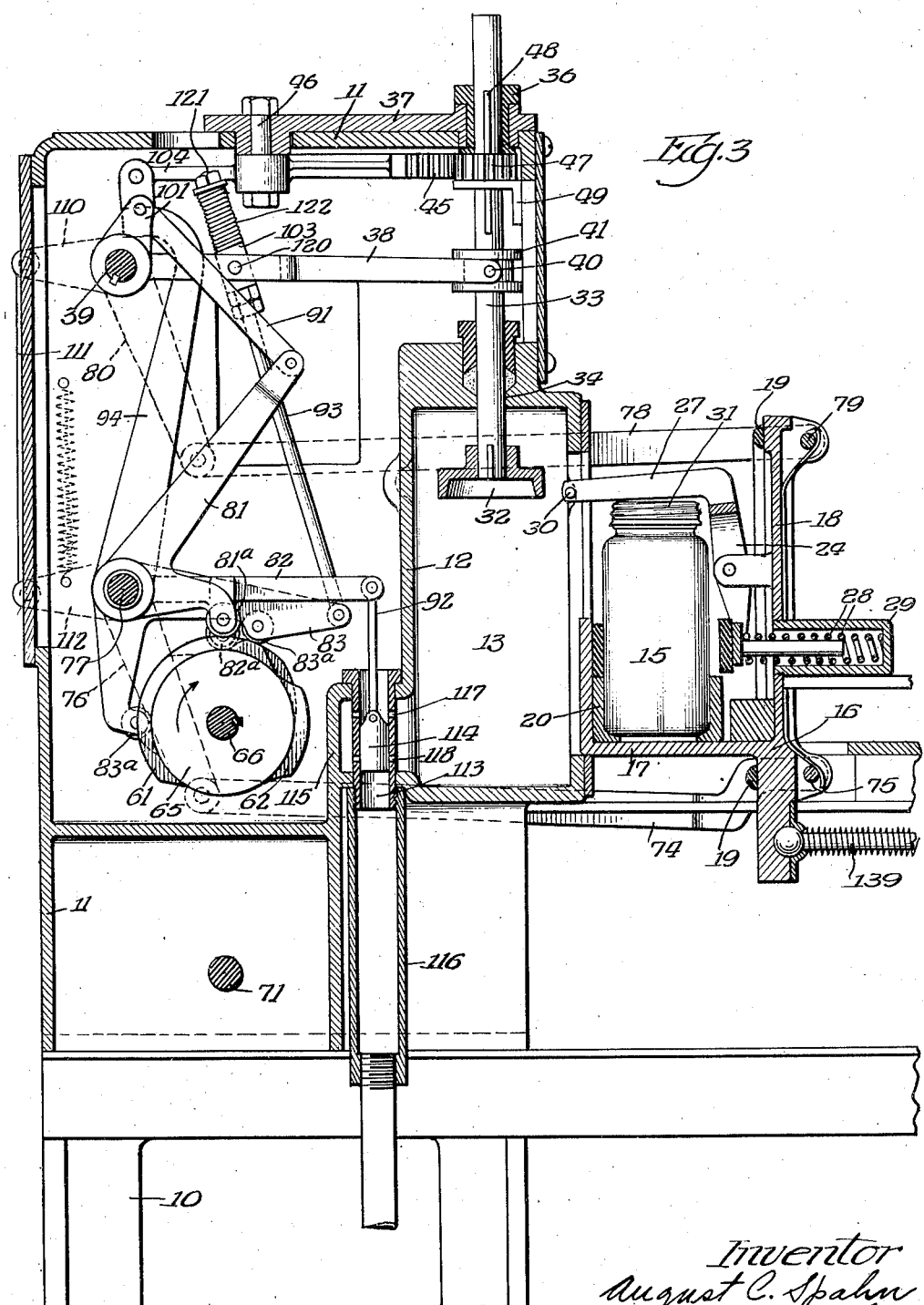
Fig. 3 is a fragmentary vertical section approximately along the line 3—3 of Fig. 2.
Figure 4:
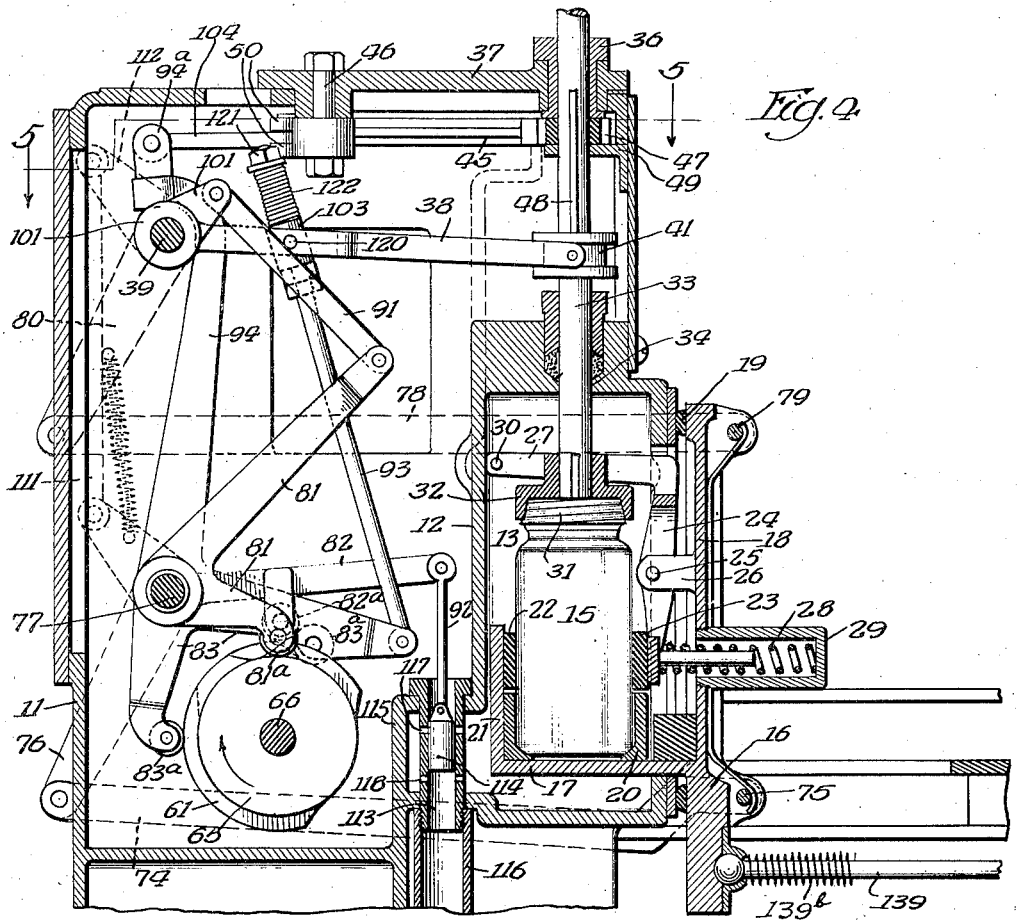
Fig. 4 is a fragmentary vertical section similar to Fig. 3 showing the parts in their relative positions just after a cap has been applied to a bottle.

In the form chosen for purposes of disclosure, the invention is embodied in a machine comprising a base 10 (Figs. 2 and 3) having a main frame 11 secured thereto. A casing 12 is formed integrally with the forward side of the frame 11 to provide a vacuum chamber 13 and has an opening 14 in its forward side through which bottles 15 may be inserted and withdrawn. A reciprocatory support 16 is slidably mounted on the frame 11 and carries a bottle holding or supporting means 17 on which a bottle 15 is automatically positioned, by means of mechanism hereinafter more fully described, when the support is in its withdrawn position, as illustrated in Figs. 1 and 3. The reciprocatory support 16 has a vertically extending closure portion 18 adapted to close the opening 14 in the casing 12 when the holding means is positioned within the casing as shown in Fig. 4, a suitable gasket 19 being secured to the closure portion 18 of the support to insure an air-tight seal against the forward wall of the casing 12.

The bottles 15 are preferably provided with annular bases or carriers 20 during their transit through the machine, so as to facilitate the handling thereof and prevent injury thereto. The holding means 17 has an upwardly extending rear portion 21 for guiding the carriers and may be provided with a rubber pad 22 for engaging the bottles. In order to hold a bottle securely during the capping operation, a rubber pad 23 is positioned diametrically opposite to the pad 22 and carried on the lower end of a lever 24 which is pivotally mounted by means of a pin 25 on lugs 26 secured to the closure portion 18. At its upper end the lever 24 is bifurcated and provided with a pair of rearwardly extending arms 27. A spring 28 is positioned intermediate the lower end of the lever 24 and a projecting portion 29 of the support 16, and is operable to engage the pad 23 with the bottle to secure the bottle to the holding means when the support 16 is in its rear or cap-applying position as shown in Fig. 4. When the holding means is withdrawn from the casing 12, pins 30 secured to the ends of the arms 27 are adapted to engage the forward wall of the casing 12 to pivot the lever 24 and release the bottle as illustrated in Fig. 3.

The invention in the form disclosed contemplates that bottles positioned on the holding means 17 will have caps 31 positioned loosely thereon and provides means operable automatically to vacuumize the chamber 13 and to apply the caps tightly to the bottles under such vacuum. In its preferred form the means for applying the cap to the bottle comprises an inverted somewhat cup-shaped cap-applying member 32 carried on the lower end of a vertically positioned shaft 33 which extends through a bore 34 in the top wall 35 of the casing 12 and has its upper end supported by means of a bearing bushing 36 mounted on a plate 37 on the top of the main frame 11. This shaft is slidably mounted in its bearings and is adapted to be moved from a position wherein the member 32 is withdrawn, such as illustrated in Fig. 3, to a lowered or operative position of the member 32, such as illustrated in Fig. 4, by means of an arm 38 which is pivoted at its rear end on a shaft 39 extending transversely of the frame 11. At its forward end this arm is bifurcated, as illustrated most clearly in Fig. 5, carries a pair of pins 40 engaging in a peripherally grooved collar 41 secured to the shaft.

The cap-applying member 32 is adapted to be rotated for the purpose of applying a cap to a bottle by means of a segmental gear 45 (Figs. 3, 4 and 5) which is rotatably supported upon a short vertical shaft 46 secured to the plate 37 on top of the main frame 11 and meshes with a pinion 47 which is slidably secured to the shaft 33 by means of a key 48. As shown in Figs. 3 and 4, the pinion 47 is positioned intermediate the lower end of the bearing bushing 36 and a bracket 49 secured to the forward portion of the main frame. The segmental gear 45 is preferably provided with a bifurcated radially extending arm 50 through which it is actuated by means hereinafter more fully described.

Figure 2:
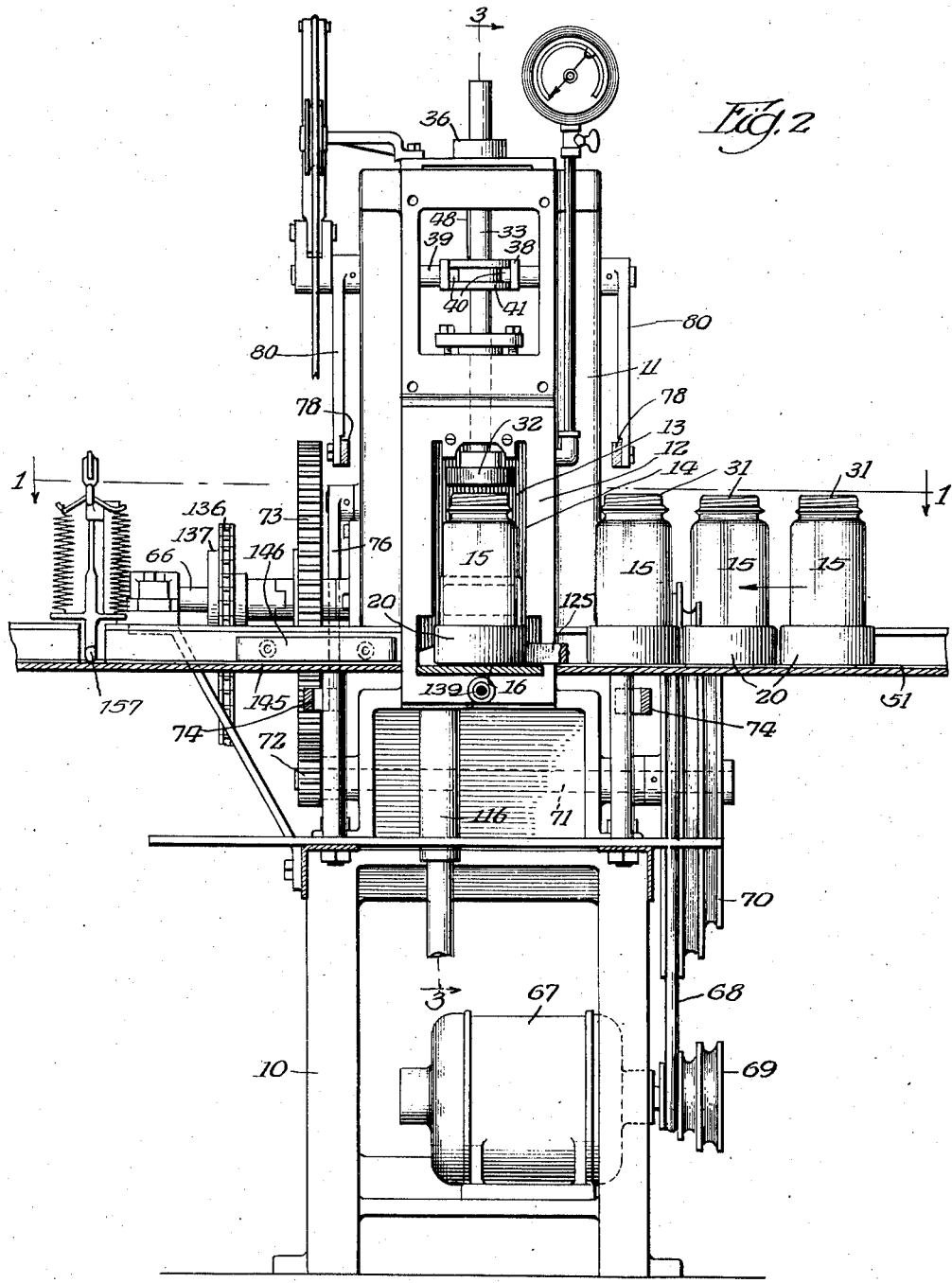
Fig. 2 is a front elevation of the machine illustrated in Fig. 1, partly in section along the line 2—2 of Fig. 1.

As illustrated in Figs. 1 and 2, a supporting track 51 is provided for supporting a plurality of carriers 20 containing bottles 15 for movement toward the reciprocating supporting means 17. This track is generally oval in form and is positioned on a level with the supporting means 17. In the preferred form of the invention, means, as hereinafter more fully described, is provided for moving the carriers along this track, the arrangement being such that an operator positioned in front of the machine at 53 (Fig. 1) can load bottles onto the track for movement counter-clockwise toward the supporting means 17, and can remove bottles from the left-hand portion of the track as they are carried away from the supporting means 17.

Means is provided for actuating the various parts of the machine so that when a bottle has been loaded onto the supporting means 17, said means is moved rearwardly into the casing 12 whereupon the casing is vacuumized and the cap-applying member 32 is moved downwardly into engagement with a loose cap on the bottle and is rotated so as to apply the cap to the bottle. As disclosed herein, these operations are accomplished by means actuated by cams 61, 62, 63 and 64 (Figs. 1, 3, 4 and 6 to 9) which are mounted on a drum 65 secured to a shaft 66 extending transversely of the main frame and rotatably mounted thereon. This shaft is herein disclosed as being driven from a motor 67 (Fig. 1) by means including a belt 68 extending between cone pulleys 69 and 70 secured respectively to the motor shaft and an intermediate shaft 71 extending parallel to the cam shaft 66. A pinion 72 (Fig. 2) on the other end of the intermediate shaft 71 meshes with a gear 73 mounted on the cam shaft 66.

The reciprocatory bottle support 16 is arranged to be actuated by the cam 61 by means of intermediate connections comprising a pair of lower links 74 connected at their forward ends to the support 16 by means of a laterally extending rod 75 and connected at their rear ends to a pair of arms 76 secured to the opposite ends of a transversely extending shaft 77 rotatably mounted on the main frame 11. A pair of upper links 78 are similarly secured at their forward ends to the upper portion of the bottle support 16 by means of a laterally extending rod or pin 79, and at their rear ends are pivotally connected to a pair of arms 80 secured to the opposite ends of the transversely extending shaft 39 which is also rotatably mounted on the side portions of the main frame 11. A bell crank lever 81 (Figs. 3, 4 and 6) is pivotally mounted on the shaft 77 and is provided with a roller 81ª on its lower arm adapted to engage the cam 61. The upper arm of the bell crank lever is connected by means of a link 91 to a short arm 101 secured to the shaft 39. In order to secure simultaneous movement of the lower links 74 and upper links 78, arms 76ª are preferably formed integrally with the hubs of the arms 76, links 111 being connected intermediate the outer end of said arms and similar arms 80ª secured to the hubs of the arms 80. These arms and links insure simultaneous rotation of the arms 76 and 80 and secure proper alinement of the closure portion 18 of the reciprocatory support 16 with the front wall of the casing 12.

Cam 62 is arranged to actuate a valve 114 which is mounted in a tubular valve casing 113 in a recessed portion 115 of the casing 12 for controlling the inlet and outlet of air to and from the casing 12. As illustrated most clearly in Figs. 3, 4 and 7, the valve casing 113 connects at its lower end with a conduit 116 connected to a suitable vacuum pump (not shown) and is provided with an upper series of inlet ports 117 and a lower series of exhaust ports 118. When the valve is in its uppermost position as shown in Fig. 4, the casing 12 is being exhausted, the air in the casing passing out through the ports 118 and downwardly through the conduit 116. When the valve is in its lower position, as shown in Figs. 3 and 7, the exhaust ports 118 have been closed and the inlet ports 117 have been opened so as to permit air to pass into the casing 12 to facilitate the withdrawal of the support 16. An arm 82 is pivotally mounted on the shaft 77 and carries a roller 82ª engaging the cam 62. At its outer end the arm 82 is connected to one end of a link 92, the other end of which is connected to the valve 114.

Figure 5:
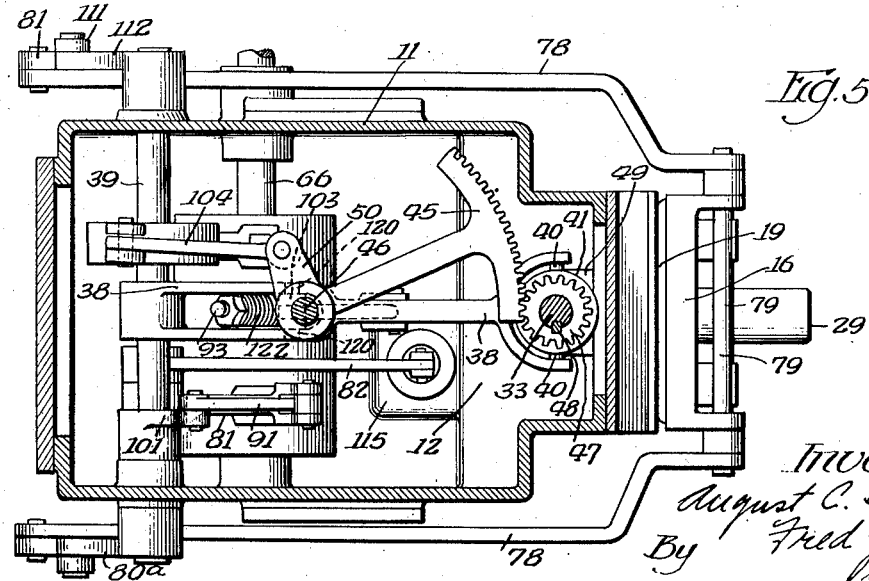
Fig. 5 is a fragmentary plan section taken along the line 5—5 of Fig. 4.

Cam 63 is arranged to lower and raise the cap-applying member 32 by means of intermediate connections comprising a bell crank lever 83 (Figs. 3, 4 and 8) pivotally mounted on the shaft 77 and carrying a roller 83ª on each of its arms for engaging the cam 63, and a link 93 pivotally connected at one end to the upper arm of the bell crank lever and at its other end to the arm 38. As illustrated in Fig. 5, the arm 38 has a bifurcated portion adjacent the shaft 39 to which a block 103 is pivotally secured by means of pins 120. The rod 93 extends slidably through the block 103, and intermediate the block and a nut 121 secured to the upper end of the rod 93 a coiled spring 122 is mounted so as to provide a yieldable connection between the cam operated bell crank lever 83 and the vertically movable supporting shaft 33 for the cap-applying member.

Cam 64 is connected to rotate the cap-applying member 32 for the purpose of screwing the caps tightly onto the bottles. In the exemplary form of the invention, the connections intermediate cam 64 and the cap-applying member include the segmental gear 45, pinion 47 and the arm 50 secured to the segmental gear, and a bell crank lever 84 (Fig. 9) pivotally mounted on the shaft 77 and provided with a roller 84a on the end of each of its arms for engagement with the cam. An arm 94 is secured to and extends upwardly from the bell crank lever 84, and at its upper end carries an eye-bolt 94a. A link 104 is secured at one end to the eye-bolt and at its other end to the arm 50. Thus, during a pivotal movement of the bell crank lever 84, the arm 94, through the eye-bolt and link, will rotate the pin 47 and the shaft 33 which is keyed thereto and carries the cap-applying member 32.

The means for advancing bottles from the loading position 53 along the track 51 to the reciprocatory support 16 is herein shown as comprising a pair of dogs 120 (Fig. 1) mounted on a slide for movement along the track 51 adjacent the loading position and operable by means including a link 121 connected to a crank 122 secured on the end of the cam shaft 66, a bell crank 123 and a link 124. During each rotation of the cam shaft, the dogs 120 reciprocate to advance the bottles toward the capping means.

For transferring the bottles from the track 51 to the reciprocatory support 16, the invention in its preferred form provides a movably mounted transfer arm 125 (Fig. 1) which is connected to and operable simultaneously with the support 16. As illustrated in Fig. 1, the arm 125 is secured to one edge of a segmental gear 126 which is pivotally secured by means of a pin 127 to the free end of an adjustable arm 128 carried on a vertical shaft 129. This shaft is pivotally mounted on the main frame 11. The segmental gear 126 preferably has small teeth and is adapted to be engaged with and disengaged from a small toothed pinion 130 secured to a short vertical shaft 131 which is driven from the cam shaft 66 by means of beveled gears 132 and 133, a horizontally extending shaft 134, a sprocket 135 on said shaft, and a chain 136 connecting said sprocket to a sprocket 137 on the cam shaft 66. Thus during operation of the machine the pinion 130 is driven continuously in a clockwise direction (Fig. 1).

To connect the segmental gear 126 to the pinion 130 and to disconnect it therefrom, an arm 138 is secured to the pivot shaft 129 and connected to the reciprocatory support 16 by a link 139 (Figs. 1, 3 and 4). Thus when the support 16 is in its withdrawn position, as shown in Fig. 1, the segmental gear 126 will be engaged with the pinion 130 and will be moved in a counter-clockwise direction until it strikes a stop pin 141 so that the arm 125 transfers a bottle carrier 20 onto the holding means 17. When the support 16 is thereafter moved toward the casing 12 the pivot shaft 129 of the transferring mechanism is rotated in a clockwise direction so as to swing the arm 128 and disconnect the segmental gear from the pinion. The segmental gear 126 is then rotated in a clockwise direction on the pivot pin 127 by means of a spring 140 which is secured at one end to and wound partially about the hub of the segmental gear, and at its other end is secured to and wound in the opposite direction partially about the shaft 129, as shown in Fig. 1. Due to the pivotal movement of the shaft 129, the transfer arm 125 is withdrawn from engagement with the bottles on the support 16, and due to the pivotal movement of the segmental gear 126 and the swinging movement of the arm 128 the transfer arm 125 is moved laterally into a position so that it may be inserted to the right of the next bottle carrier 20a, which in the meantime has been advanced along the track 51 by means of the dogs 120 to the end position on the track adjacent the support 16. After the capping operation, upon the withdrawal of the support 16, the transfer arm is inserted in back of the carrier 20a and the segmental gear 126 is again engaged with the pinion 130 so as to swing the transfer arm 125 and move the carrier 20a and bottle 15a onto the holding means 17.

Preferably the link 139 (Fig. 1) extends through a slot in the arm 138 and is provided with a nut 139a on its outer end. A coiled spring 139b is positioned on the link intermediate the support 16 and arm 138. This provides a yieldable connection between the support 16 and arm 138 so that if the arm 125 engages the stop pin 141 prior to the disengagement of the segmental gear 126 from the pinion 130 the arm 128 can swing slightly to permit the gear teeth to disengage.

As one bottle carrier is transferred to the holding means 17 from the track 51, it pushes off the bottle which has just been capped onto a table 145 (Figs. 1 and 2) leading to the other end of the track 51. This table is provided with a yieldably mounted guide bar 146 along one side and a traveling belt 147 along the other side, so that as a bottle is moved onto the table the belt 147 engages the carrier 20 of the bottle and rolls it along the guide 146 onto the adjacent end of the track 51. The belt 147 is herein shown mounted on four idler pulleys 148, 149, 150 and 151, and a drive pulley 152 which is secured to the upper end of a short vertical shaft 153, the other end of which carries a beveled gear 154 meshing with a beveled gear 155 on the shaft 134. Preferably means is provided for jogging the bottle carriers 20 along the track 51 away from the table 145 so as to relieve the strain on the belt feeding means. Such a jogging means is herein indicated generally at 156 as including a bar 157 connected to the crank 122 so as to be operated simultaneously with the advancing dogs 120.

The operation of the machine, assuming that the right-hand portion of the track 51 (Fig. 1) is filled with carriers supporting bottles having caps loosely placed thereon, that the transfer arm 125 has just transferred a carrier 20 and bottle 15 to the reciprocatory support 16, that a vacuum pump in operation is connected to the conduit 116, and that the motor 67 is in operation, the parts are then in the position shown in Figs. 1 and 3 and a bottle will be capped during each revolution of the cam shaft 66. The holding means 17 is first moved into the casing 12 and as it is moved the pins 30 are disengaged from the front casing wall so as to permit the spring 28 to expand and clamp the bottle 15 against rotation between the jaws 22 and 23. As the support 16 moves into the casing, the segmental gear 126 of the transferring mechanism is disengaged from the pinion 130 (Fig. 1) and the transfer arm 125 is swung out and around ready for insertion behind the next bottle carrier 20ª. During these operations the valve 113 is in its lowermost position, as shown in Fig. 3, to permit air in the casing 12 to discharge freely as the holding means and bottle move in.

As the holding means 17 reaches its inserted position, as shown in Fig. 4, the gasket 19 seals the closure 18 against the front of the casing 12 and the valve 113 is then moved by the cam 62 to the position shown in Fig. 4, so as to exhaust the casing 12. Thereupon the cam 63 operates to lower the cap-applying member 32 into engagement with the cap 31 on the bottle, and the cam 64, through the intermediate connections, rotates the cap-applying member to screw the cap tightly onto the bottle. During the application of the cap the bottle is effectively held against rotation by the clamping jaws 22 and 23.

Upon the completion of the capping operation, the cap-applying member 32 is raised (Fig. 8) and rotated in the reverse direction (Fig. 9) to be in readiness for the next cycle, and the valve 113 is moved to its lower position (Fig. 7) so as to admit air into the casing 12 and facilitate the withdrawal of the support 16 and closure 18. During the withdrawal of the support the transfer arm 125 is inserted behind the next bottle carrier 20ª which has been advanced to the end position due to the rotation of the crank 122 and the movement of the dogs 120, and the segmental gear 126 is then engaged with the pinion 130. The transfer arm 125 is then actuated to move the next bottle 15ª onto the holding means 17 and to push the capped bottle onto the table 145 whereupon the cycle of operations is repeated.

It will be apparent that the invention, as disclosed herein, provides a machine operable automatically to cap, in a vacuum, bottles having screw caps placed loosely thereon and furthermore embodies means for handling these bottles automatically so as to move them into and out of the vacuum chamber.

Having thus described the invention, what I claim as new and desire to secure by Letters Patent, is:

1. A machine for applying screw threaded caps to bottles in a vacuum having, in combination, a stationary casing providing a vacuum chamber and having an opening in one side thereof, a reciprocatory bottle support mounted for movement into and out of said casing through said opening, means movable with said support for closing said opening when the support is in the casing, means for supplying bottles having caps placed loosely thereon to said reciprocatory support comprising a track leading to said support when in its withdrawn position and extending transversely thereof and means for moving bottles along said track and onto said support when the support is in its withdrawn position, means for receiving capped bottles from said support comprising a track leading away from the opposite side of said support, means for reciprocating said support, means automatically operable when the support is in the casing to exhaust said casing, means automatically operable when the casing is exhausted to screw the cap tightly onto the bottle, and means automatically operable when the support is withdrawn to move another bottle onto the support and remove the capped bottle therefrom.

2. A machine for applying screw threaded caps to bottles in a vacuum having, in combination, a stationary casing providing a vacuum chamber and having an opening in one side thereof, a reciprocatory bottle support mounted for movement into and out of said casing through said opening, means movable with said support for closing said opening when the support is in the casing, means for supplying bottles having caps placed loosely thereon to said reciprocatory support comprising a track leading to said support when it its withdrawn position and extending transversely thereof, means for moving bottles along said track and onto said support when the support is in its withdrawn position, means for receiving capped bottles from said support comprising a track leading away from the opposite side of said support, means for reciprocating said support, means automatically operable when the support is in the casing to exhaust said casing, and means automatically operable when the casing is exhausted to screw the cap tightly onto the bottle.

3. A machine for applying screw threaded caps to bottles in a vacuum having, in combination, a stationary casing providing a vacuum chamber and having an opening in one side thereof, a reciprocatory bottle support mounted for movement into and out of said casing through said opening, means movable with said support for closing said opening when the support is in the casing, means for supplying bottles having caps placed loosely thereon to said reciprocatory support comprising a track leading to said support when in its withdrawn position and extending transversely thereof, means for moving bottles along said track and onto said support when the support is in its withdrawn position, means for receiving capped bottles from said support comprising a track leading away from the opposite side of said support, means for reciprocating said support, and means automatically operable when the support is in the casing to exhaust said casing and screw the cap tightly onto the bottle.

4. A machine for applying screw threaded caps to bottles in a vacuum having, in combination, a stationary casing providing a vacuum chamber and having an opening in one side thereof, a reciprocatory bottle support mounted for movement into and out of said casing through said opening, means movable with said support for closing said opening when the support is in the casing, means for supplying bottles having caps placed loosely thereon to said reciprocatory support comprising a track leading to said support when in its withdrawn position and extending transversely thereof, means for moving bottles along said track and onto said support when the support is in its withdrawn position, means for reciprocating said support, and means automatically operable when the support is in the casing to exhaust said casing and screw the cap tightly onto the bottle.

5. A machine for applying screw threaded caps to bottles in a vacuum having, in combination, a stationary casing providing a vacuum chamber and having an opening in one side, a support mounted for movement toward and from the open side of said casing, holding and clamping means for a bottle carried on said support for insertion through said opening into the casing, closing means carried on said support for sealing said opening when the holding means is within the casing, means for automatically reciprocating said support, means automatically operable when the support is in its withdrawn position to place a bottle, having a cap loosely positioned thereon, on said holding means, means for exhausting said casing when said opening is sealed, and means automatically operable to screw the cap to the bottle after the casing has been exhausted.

6. A machine for applying screw threaded caps to bottles in a vacuum having, in combination, a stationary casing providing a vacuum chamber and having an opening in one side, a bottle support mounted for movement into and out of the open side of said casing, closing means movable with said support for sealing said opening when the support is within the casing, means for reciprocating said support, means automatically operable when the support is in its withdrawn position to place a bottle, having a cap loosely positioned thereon, on said support, means for clamping the bottle against rotation when the support is in the casing, means for exhausting said casing when said opening is sealed, and means automatically operable to screw said cap to the bottle after the casing has been exhausted.

7. A machine for applying screw threaded caps to bottles in a vacuum having, in combination, a stationary casing providing a vacuum chamber having an opening in one side, a reciprocatory bottle support mounted for movement into and out of said casing, means carried on said support for closing said opening when the support is within the casing, means for reciprocating said support, means automatically operable when the support is in its withdrawn position to place a bottle having a cap loosely positioned thereon, on said support, means for exhausting said casing when said opening is closed, and means automatically operable to screw said cap to the bottle after the casing has been exhausted.

8. A machine for applying caps to bottles in a vacuum having, in combination, a casing providing a vacuum chamber having an opening in one side, a reciprocatory bottle support mounted for movement into and out of said casing, means carried on said support for closing said opening when the support is within the casing, yieldable means on said support for clamping the bottle against rotation when in the casing arranged to be released as the support is withdrawn, means for reciprocating said support, means for exhausting said casing when said support is therein and the opening is closed, and means automatically operable to screw a cap to a bottle on the support after the casing has been exhausted.

9. A machine for applying screw caps to bottles in a vacuum having, in combination, a stationary casing providing a vacuum chamber and having an opening in one wall thereof, a reciprocatory bottle support mounted for movement toward and from said casing opening, means carried on said support operable to close said opening when the bottle on the support is in the casing, supporting means for a plurality of bottles having screw caps placed loosely thereon leading to said support when in its withdrawn position, means operable when the support is withdrawn from the casing to transfer a bottle from said supporting means to the support, and means operable automatically when said support is moved to close the casing to exhaust the casing and apply a screw cap tightly to the bottle.

10. A machine for applying caps to bottles in a vacuum having, in combination, a casing providing a vacuum chamber and having an opening in one wall thereof, a reciprocatory bottle support mounted for movement into and out of said casing through said opening, means carried on said support operable to close said opening when the support is in the casing, means for clamping a bottle against rotation on said support when in said casing, and means operable automatically when said support is moved into the casing to exhaust the casing and screw a cap tightly to the bottle.

11. A machine for automatically applying screw threaded caps to bottles while in a vacuum comprising, in combination, a frame, a casing providing a vacuum chamber mounted on said frame and having a recess in its forward side, a shaft extending downwardly through the upper wall of the casing and slidably mounted therein, an inverted cup-shaped cap-applying member on the lower end of said shaft, means for exhausting said chamber including a control valve, a support positioned in front of said casing and slidably mounted on said frame for movement toward and from the casing, holding means for a bottle carried on the rear side of said support and adapted, when said support is in its operative position, to extend into the vacuum chamber through said recess to position the bottle beneath said cap-applying member, said support having a vertically extending portion adapted to close the recess in said casing, means for lowering said shaft and forcing said cap-applying member into frictional engagement with a cap placed loosely on said bottle, rotating said shaft to apply said cap to the bottle, and raising said shaft, and means for inserting and withdrawing said support into and from said casing.

12. A machine for applying screw threaded caps to bottles while in a vacuum comprising, in combination, a frame, a casing providing a vacuum chamber mounted on said frame and having a recess in its forward side, a shaft extending downwardly through the upper wall of the casing and slidably mounted therein, an inverted cup-shaped cap-applying member on the lower end of said shaft, means for exhausting said chamber including a control valve, a support positioned in front of said casing and slidably mounted on said frame for movement toward and from the casing, holding means for the bottle carried on the rear side of said support and adapted, when said support is in its rear position, to extend into the vacuum chamber through said recess to position the bottle beneath said cap-applying member, clamping means operative to hold the bottle against turning when the holding means is inserted into the casing, means to close the recess in said casing, means for lowering said cap-applying member into frictional engagement with a cap placed loosely on said bottle, rotating said member to apply said cap to the bottle, and raising said member, and means for withdrawing said support from said casing.

13. A machine for applying screw threaded caps to bottles while in a vacuum comprising, in combination, a frame, a casing providing a vacuum chamber mounted on said frame and having a recess therein, a shaft extending downwardly through the upper wall of the casing and slidably mounted therein, an inverted cup-shaped cap-applying member on the lower end of said shaft, means for exhausting said chamber including a control valve, a support slidably mounted on said frame for movement toward and from the casing, holding means for a bottle carried on said support and adapted, when said support is in one position, to extend into the vacuum chamber through said recess to position the bottle beneath said cap-applying member, said support having a portion adapted to close the recess in said casing, means for operating said parts including continuously driven cam mechanism comprising a first cam for inserting said holding means into the vacuum chamber, a second cam for actuating said control valve to exhaust said chamber, a third cam for lowering said cap-applying member into frictional engagement with a cap placed loosely on said bottle, and a fourth cam for rotating said member to apply said cap to the bottle.

14. A machine for applying screw threaded caps to bottles while in a vacuum having, in combination, a casing providing a vacuum chamber and having an opening in one side, a shaft extending downwardly through the upper wall of the casing and rotatably mounted therein, a cap-applying member on said shaft within the casing, means for exhausting said chamber, a support positioned in front of said casing and mounted for movement toward and from the casing, holding means for a bottle carried on said support and adapted to be inserted into the vacuum chamber through said opening to position the bottle beneath said cap-applying member, means for closing the opening in said casing, means for automatically lowering said cap-applying member into frictional engagement with a cap placed loosely on said bottle, rotating said shaft to apply said cap to the bottle, and raising said cap-applying member, and means for automatically withdrawing said support from said casing.

15. A machine for applying screw threaded caps to bottles while in a vacuum having, in combination, a frame, a casing providing a vacuum chamber mounted on said frame and having an opening in one wall, a shaft extending downwardly through the upper wall of the casing and rotatably mounted therein, a cap-applying member on the lower end of said shaft, means for exhausting said chamber, a reciprocatory bottle support mounted on said frame for movement toward and from the casing, means for holding the bottle against rotation relatively to the support, means for closing the opening in said casing, means for causing a relative vertical movement of the bottle and cap-applying member to cause frictional engagement of said member with a cap placed loosely on the bottle, and means for rotating said shaft to apply said cap to the bottle.

16. A machine for applying screw threaded caps to bottles in a vacuum having, in combination, a stationary casing forming a vacuum chamber and having an opening in one side thereof, a reciprocatory bottle support mounted for movement toward and from said opening, a cap-applying member mounted in said casing for applying screw threaded caps placed loosely on bottles carried on said support, means for automatically reciprocating said support, means operable automatically to position a bottle on said support when in its withdrawn position, means operable automatically upon the insertion of said support in said chamber to close said opening, means operable automatically upon the closing of the chamber to exhaust the chamber, means operable automatically to cause a relative axial movement between said cap-applying member and a bottle on the support for engaging the member with a cap on the bottle, and means for automatically causing a relative rotary movement between said cap-applying member and bottle for tightening the cap on the bottle.

17. A machine for applying screw threaded caps to bottles in a vacuum having, in combination, a stationary casing forming a vacuum chamber and having an opening in one side thereof, a reciprocatory bottle support mounted for movement into and out of said opening, a cap-applying member mounted in said casing for applying screw threaded caps placed loosely on bottles carried on said support, supply means for conveying bottles to a position adjacent said support when withdrawn from the casing, means operable automatically when the support is withdrawn to transfer a bottle from said supply means to said support and to remove a capped bottle from said support, conveyor means for receiving said capped bottle, means for automatically reciprocating said support, means operable automatically upon the insertion of said support in said chamber to close said opening, means operable automatically upon the closing of the chamber to exhaust the chamber, means operable automatically to cause a relative axial movement between said cap-applying member and a bottle on the support for engaging the member with a cap on the bottle, and means for automatically causing a relative rotary movement between said cap-applying member and bottle for tightening the cap on the bottle.

18. A machine for applying screw threaded caps to bottles in a vacuum having, in combination, a stationary casing forming a vacuum chamber and having an opening in one side thereof, a reciprocatory bottle support mounted for movement into and out of said opening, a cap-applying member mounted in said casing for applying screw threaded caps placed loosely on bottles carried on said support, means for automatically supplying bottles having caps placed loosely thereon one-by-one to said support when in its withdrawn position, means on said support for closing said opening, means operable automatically upon the closing of the chamber to exhaust the chamber, means operable automatically to cause a relative axial movement between said cap-applying member and a bottle on the support for engaging the member frictionally with a cap on the bottle, and means for automatically causing a relative rotary movement between said cap-applying member and bottle for tightening the cap on the bottle.

19. An apparatus for vacuumizing screw cap containers, including means forming a sealing chamber, power operated mechanism for moving a container into said sealing chamber, means for holding a container against rotation in said sealing chamber, a cap-applying head arranged in said chamber, power operated mechanism for moving said cap-applying head into frictional engagement with a screw cap on the container to be sealed, and power operated means for rotating said cap-applying head.

20. An apparatus for vacuumizing screw cap containers, including means forming a sealing chamber adapted to receive a container with a screw cap loosely mounted thereon, a movable support for carrying a container into the sealing chamber, means for holding the container against rotation when in the sealing chamber and power driven, cam operated means for engaging and rotating the conventional screw cap while the container is vacuumized.

21. An apparatus for vacuumizing screw cap containers, including means forming a sealing chamber, a cap-applying head for engaging the screw caps on the containers, means including a power operated valve for vacuumizing said chamber, power operated means for rotating said head, power operated means for raising and lowering said head in timed relation, a container support movable into said chamber for positioning a container beneath said head, and means for holding the container against rotation during the cap-applying operation.

22. An apparatus for vacuumizing screw cap containers, including means forming a sealing chamber, a cap-applying member for engaging screw caps on the containers, means for positioning a container in said sealing chamber under the cap-applying member, power driven, cam operated means for automatically rotating said member when the sealing chamber has reached the desired degree of vacuum, power driven, cam operated means for raising and lowering said member in timed relation, and means for holding the container against rotation during the cap-applying operation.

23. An apparatus for vacuumizing screw cap containers, including means forming a sealing chamber, a cap-applying member for engaging the screw caps on the containers, a container support movable from a withdrawn position, wherein it is adapted to receive a container, to a position within said chamber, wherein the container is positioned under said cap-applying member, means for holding the container against rotation when in the sealing chamber automatically releasable when said support is withdrawn, power operated means automatically operative when the desired degree of vacuum is reached in the sealing chamber to lower and rotate said cap-applying member, and automatically operative when the vacuum is broken in the sealing chamber to lift said cap-applying member.

24. An apparatus for vacuumizing screw cap containers, including means forming a sealing chamber, a cap-applying member for engaging the screw caps on the containers, power operated means for inserting a container into the sealing chamber and for holding the container against rotation, and automatic power operated means for rotating and raising and lowering said cap-applying member in timed relation to engage the member frictionally with a cap placed loosely on the container, and to screw the cap onto the container.

AUGUST C. SPAHN.